(12) United States Patent
Ebert (10) Patent No.: US 12,295,345 B1
(45) Date of Patent: May 13, 2025

(54) LITTER BOX COVER SECTION WITH SELF-BAGGING FEATURE

(71) Applicant: Omega Paw Inc., St. Marys (CA)

(72) Inventor: Michael Adrian Ebert, St. Marys (CA)

(73) Assignee: Omega Paw Inc., Ontario (CA)

( * ) Notice: Subject to any disclaimer, the term of this patent is extended or adjusted under 35 U.S.C. 154(b) by 579 days.

(21) Appl. No.: 17/494,423

(22) Filed: Oct. 5, 2021

(51) Int. Cl.
*A01K 1/01* (2006.01)

(52) U.S. Cl.
CPC .................................. *A01K 1/0114* (2013.01)

(58) Field of Classification Search
CPC ......... A01K 1/01; A01K 1/011; A01K 1/0114
See application file for complete search history.

(56) References Cited

U.S. PATENT DOCUMENTS

| | | | | |
|---|---|---|---|---|
| 4,096,827 A * | 6/1978 | Cotter | ............... | A01K 1/0125 D30/161 |
| 4,243,259 A * | 1/1981 | Wright | ............... | E01H 1/1206 294/1.3 |
| 4,327,667 A * | 5/1982 | Bilak | ............... | A01K 1/0114 209/352 |
| 4,465,018 A * | 8/1984 | Mopper | ............... | A01K 1/0117 119/164 |
| 4,522,150 A * | 6/1985 | Gershman | ............... | A01K 1/0114 119/165 |
| 4,854,267 A * | 8/1989 | Morrow | ............... | A01K 1/0114 119/168 |
| 4,886,014 A * | 12/1989 | Sheriff | ............... | A01K 1/0114 209/374 |
| 4,932,360 A * | 6/1990 | O'Connor | ............... | A01K 1/0125 119/168 |
| 5,107,797 A * | 4/1992 | LaRoche | ............... | A01K 1/0114 209/296 |
| 5,168,834 A * | 12/1992 | Buschur | ............... | A01K 1/0114 209/251 |
| 5,178,099 A * | 1/1993 | Lapps | ............... | A01K 1/0114 119/161 |

(Continued)

FOREIGN PATENT DOCUMENTS

| | | | | |
|---|---|---|---|---|
| EP | 2329709 A1 * | 6/2011 | ........... | A01K 1/0114 |
| WO | WO-9313650 A1 * | 7/1993 | ........... | A01K 1/0114 |

(Continued)

OTHER PUBLICATIONS

WO 2015061452—Original & Translation (Year: 2015).*
WO 0223977—Original & Translation (Year: 2002).*

*Primary Examiner* — Morgan T Jordan
*Assistant Examiner* — Kari A Bradberry
(74) *Attorney, Agent, or Firm* — Gowling WLG (Canada) LLP (57) ABSTRACT

Before inserting the waste removal tray into a self-cleaning litter box that is cleaned by rolling, a user envelopes the waste removal tray within a bag, with the bag secured by a bag retainer on the litter box. After rolling the litter box, the cat excrement will rest inside the waste removal tray, atop the collapsed bag. During withdrawal of the waste removal tray, retention of an edge of the bag cooperates with movement of the waste removal tray to invert the bag and retain the cat excrement within the inverted bag. After the waste removal tray has been completely withdrawn, the inverted bag will be suspended by the bag retainer with the cat excrement inside, and the bag can be conveniently disposed of.

15 Claims, 8 Drawing Sheets

(56) References Cited

U.S. PATENT DOCUMENTS

| | | | | |
|---|---|---|---|---|
| 5,226,388 A * | 7/1993 | McDaniel | A01K 1/0114 | 119/166 |
| 5,394,833 A * | 3/1995 | Glass | A01K 1/0114 | 209/251 |
| 5,402,751 A * | 4/1995 | De La Chevrotiere | A01K 1/0114 | 209/373 |
| 5,503,442 A * | 4/1996 | Lee | E01H 1/1206 | 294/1.4 |
| 5,507,252 A | 4/1996 | Ebert | | |
| 5,544,620 A * | 8/1996 | Sarkissian | A01K 1/0114 | 119/166 |
| 5,673,648 A * | 10/1997 | Ayle | A01K 1/0114 | 119/166 |
| 5,741,036 A * | 4/1998 | Ring | A01K 1/0114 | 294/1.3 |
| 5,752,465 A * | 5/1998 | Page | A01K 1/0114 | 119/166 |
| 5,785,000 A * | 7/1998 | Barbary | A01K 1/0114 | 119/166 |
| 5,823,137 A * | 10/1998 | Rood | A01K 1/0114 | 119/168 |
| 5,911,194 A * | 6/1999 | Pierson, Jr. | A01K 1/0114 | 119/166 |
| 6,463,881 B2 * | 10/2002 | Reitz | A01K 1/0114 | 119/170 |
| 6,494,165 B2 * | 12/2002 | Asbury | A01K 1/0114 | 119/165 |
| 6,997,137 B1 * | 2/2006 | Ricke | A01K 1/011 | 119/168 |
| D635,726 S * | 4/2011 | Lawson | D30/161 | |
| 8,109,237 B1 * | 2/2012 | Tsengas | A01K 1/0114 | 119/616 |
| 8,413,608 B2 * | 4/2013 | Sharp | A01K 29/00 | 119/166 |
| 8,985,653 B1 * | 3/2015 | Kest | A01K 1/0114 | 294/1.3 |
| 9,185,879 B2 * | 11/2015 | Bellini | A01K 1/0114 | |
| 9,615,538 B2 * | 4/2017 | Shamir | A01K 1/0114 | |
| 10,182,551 B2 * | 1/2019 | Sage, Jr. | B07B 1/02 | |
| 10,321,659 B1 * | 6/2019 | Turner | A01K 1/0114 | |
| 2010/0258056 A1 * | 10/2010 | Hong | A01K 1/011 | 119/167 |
| 2011/0214614 A1 * | 9/2011 | Sharp | A01K 1/0107 | 119/166 |
| 2013/0019810 A1 * | 1/2013 | Romano | A01K 1/0114 | 119/167 |
| 2013/0277509 A1 * | 10/2013 | Cheek | A01K 1/0114 | 294/1.4 |
| 2017/0231190 A1 * | 8/2017 | Brawn | A01K 1/0114 | 119/166 |
| 2021/0400906 A1 | 12/2021 | Ebert | | |

FOREIGN PATENT DOCUMENTS

| WO | WO-2011037637 A1 * | 3/2011 | A01K 1/0114 |
|---|---|---|---|
| WO | WO-2012154175 A1 * | 11/2012 | A01K 1/0114 |

\* cited by examiner

LITTER BOX COVER SECTION WITH SELF-BAGGING FEATURE

TECHNICAL FIELD

The present disclosure relates to litter boxes, and in particular to covered litter boxes.

BACKGROUND

The species *Felis catus*, or common housecat, has been the companion of humanity since at least the age of the ancient Egyptian civilization. In more modern times, the housecat, as its name implies, frequently resides in human homes, where it forms part of the family. Like any other mammal, the housecat has certain excretory needs. These are typically accommodated by the use of a litter box, which typically takes the form of a pan in which a specialized granular substance, known generally as "kitty litter", is disposed. The solid waste, and clumps from liquid waste, can be sifted from the kitty litter and disposed of in a suitable manner.

As can be expected, the material deposited by the cat in the litter pan does not usually emit a pleasing smell, and it is common to provide a cover for the litter pan to limit malodorous emanations and also shield the excretions from view. These covers will usually include a doorway through which the housecat can pass. While such covers present an improvement over an open litter pan, they must still be removed in order to remove waste and refill the kitty litter.

More recently, so-called "self-cleaning" litter boxes have become available, such as the Omega Paw Roll'n Clean Litter Box. With this design, a litter pan is covered by a litter box cover secured to the litter pan. The complete litter box has a curved side and flat base so that the assembly can be rolled onto its side, and then back onto its base. A grate extends vertically (when the litter box is upright) within the litter box, substantially perpendicular to the base, with a lower end at or adjacent the base and an upper end that terminates in a shelf that supports a waste removal tray. The waste removal tray is adapted to be selectively slid into and out of the litter box cover, with suitable retaining elements provided in the litter box cover section to hold the waste removal tray in position on the shelf during rolling. Upon rolling of the litter box onto its side, the granular kitty litter begins to pass through the grate while the solid waste and urine-saturated clumps are trapped on the surface of the grate, being too large to pass therethrough. On further rolling, the litter box is turned upside down or nearly so. Consequently, the urine-saturated clumps and solid waste fall from the grate to the inner surface of the top side of the litter box cover and the kitty litter passes through the grate so as to be cleaned kitty litter. Rolling the litter box back in the other direction causes the solid waste and urine-saturated clumps to fall into the waste removal tray and the cleaned kitty litter falls back through the grate into the litter pan. The waste removal tray can then be withdrawn to dispose of the waste.

While a self-cleaning litter box of this type represents a substantial improvement over the prior art, it still leaves the unpleasant task of transferring the waste from the litter tray into a plastic bag or other suitable receptacle for disposal, with the concomitant risk of spillage.

SUMMARY

In one aspect, a litter box comprises an enclosure having a base adapted to rest on a substantially flat surface, a roof and a convexly curved sidewall whereby the litter box can be rolled along the convexly curved sidewall, onto its roof, and then back along the convexly curved sidewall onto its base. The base of the enclosure forms a litter pan adapted for receiving granular kitty litter and cat excrement comprising at least one of solid waste and urine-saturated clumps. The enclosure has a feline transit doorway opening into an interior volume thereof. The feline transit doorway is adapted to accommodate *Felis catus* ingress into and egress from the interior volume. A grate extends from adjacent the base into the interior volume, and a shelf extends from adjacent the convexly curved sidewall into the interior volume, with the grate and the shelf converging in the interior volume. The shelf is adapted to support a waste removal tray having its tray opening facing the roof of the enclosure. The enclosure has a tray insertion aperture proximal to the shelf whereby the waste removal tray can be selectively inserted into and withdrawn from the enclosure. Upon rolling of the enclosure onto the convexly curved sidewall, the kitty litter begins to pass through the grate while the cat excrement is trapped on the surface of the grate, being too large to pass therethrough. On further rolling, the enclosure is substantially inverted, whereby the cat excrement falls from the grate onto an inner surface of the roof and the kitty litter passes through the grate so as to become cleaned kitty litter. Rolling the enclosure back in the other direction causes the cat excrement to fall into the waste removal tray via the tray opening thereof and causes the cleaned kitty litter to fall back through the grate into the litter pan. The enclosure has at least one retaining element to maintain the waste removal tray in position on the shelf during rolling of the enclosure, and the waste removal tray can be withdrawn to dispose of the cat excrement. At least one bag retainer is disposed on the enclosure adjacent the tray insertion aperture. The waste removal tray is loosely enveloped by a flexible bag while the waste removal tray is disposed on the shelf with its tray opening facing an inner surface of the roof of the enclosure, and the at least one bag retainer releasably retains the bag. Upon withdrawal of the waste removal tray from the enclosure, retention of the bag cooperates with movement of the waste removal tray to invert the plastic bag and retain the cat excrement within the inverted bag.

In an embodiment, the enclosure is formed by a litter box pan section and a litter box cover section releasably securable to the litter box pan section, and the litter box cover section is adapted to cover the litter box pan section to form the litter box. In a particular embodiment, the convexly curved sidewall of the enclosure is formed by a convexly curved side of the litter box pan section cooperating with a convexly curved side of the litter box cover section, and the feline transit doorway is formed by respective arches formed in the litter box pan section and the litter box cover section, with the respective arches being in registration with one another.

In an embodiment, the grate and the shelf are disposed on the litter box pan section, the tray insertion aperture is disposed on the litter box cover section, and the bag retainer(s) may be disposed on the litter box cover section.

In an embodiment, the bag retainer(s) may be disposed on an outer surface of the enclosure.

In some embodiments, the bag retainer(s) may comprise a clip.

In another aspect, a litter box cover section is adapted to cover, and is releasably securable to, a corresponding litter pan to form a litter box. The litter box cover section has a convexly curved side adapted for rolling along a substantially flat surface. The litter box cover section has a tray insertion aperture through which a waste removal tray can be selectively inserted into the litter box cover section and withdrawn therefrom to dispose of cat excrement. At least one bag retainer is disposed on the litter box cover section adjacent the tray insertion aperture, the bag retainer(s) being adapted to releasably retain a flexible bag.

In an embodiment, the litter box cover section has at least one retaining element to retain the waste removal tray during rolling.

In an embodiment, the litter box cover section may further comprise the waste removal tray.

In an embodiment, the bag retainer(s) may be disposed on an outer surface of the enclosure.

In some embodiments, the bag retainer(s) may comprise a clip.

In another aspect, a method of removing cat excrement from a litter box is provided. The litter box comprises an enclosure having a base adapted to rest on a substantially flat surface, a roof and a convexly curved sidewall whereby the litter box can be rolled along the convexly curved sidewall, onto its roof, and then back along the convexly curved sidewall onto its base. The base of the enclosure forms a litter pan containing granular kitty litter and cat excrement comprising at least one of solid waste and urine-saturated clumps. The enclosure has a feline transit doorway opening into an interior volume thereof, the feline transit doorway adapted to accommodate *Felis catus* ingress into and egress from the interior volume. A grate extends from adjacent the base into the interior volume and a shelf extends from adjacent the convexly curved sidewall into the interior volume, with the grate and the shelf converging in the interior volume. The shelf is adapted to support a waste removal tray having its tray opening facing the roof of the enclosure, and the enclosure has a tray insertion aperture proximal to the shelf whereby the waste removal tray can be selectively inserted into and withdrawn from the enclosure. The enclosure has at least one retaining element to maintain the waste removal tray in position on the shelf during rolling of the enclosure. The method comprises rolling the enclosure onto the convexly curved sidewall, whereby the kitty litter begins to pass through the grate while the cat excrement is trapped on the surface of the grate, being too large to pass therethrough, further rolling the enclosure until the enclosure is substantially inverted, whereby the cat excrement falls from the grate onto an inner surface of the roof and the kitty litter passes through the grate so as to become cleaned kitty litter, rolling the enclosure back in the other direction, thereby causing the cat excrement to fall into the waste removal tray via the tray opening thereof and causing the cleaned kitty litter to fall back through the grate into the litter pan, and withdrawing the waste removal tray to dispose of the cat excrement. The method is characterized in that during rolling of the enclosure, while the waste removal tray is disposed on the shelf with its tray opening facing an inner surface of the roof of the enclosure, the waste removal tray is loosely enveloped by a flexible bag and, during withdrawal of the waste removal tray, an edge of the bag is retained substantially fixed relative to the waste removal tray whereby withdrawal of the waste removal tray inverts the plastic bag whereby the cat excrement is retained within the inverted plastic bag.

In an embodiment, the bag is retained by at least one bag retainer disposed on the enclosure adjacent the tray insertion aperture.

In an embodiment, the bag retainer(s) may be disposed on an outer surface of the enclosure.

In some embodiments, the bag retainer(s) may comprise a clip.

In some embodiments, the method further comprises, before inserting the waste removal tray into the enclosure through the tray insertion aperture, enveloping the waste removal tray within the bag, and inserting the enveloped waste removal tray together with the enveloping bag through the tray insertion aperture into the enclosure.

In some embodiments, the enclosure is formed by a litter box pan section and a litter box cover section releasably securable to the litter box pan section, and the litter box cover section is adapted to cover the litter pan to form the litter box.

In some embodiments, the convexly curved sidewall of the enclosure is formed by a convexly curved side of the litter box pan section cooperating with a convexly curved side of the litter box cover section and the feline transit doorway is formed by respective arches formed in the litter box pan section and the litter box cover section, with the respective arches being in registration with one another.

In some embodiments, the grate and the shelf are disposed on the litter box pan section and the tray insertion aperture is disposed on the litter box cover section. In particular embodiments, the bag is retained by at least one bag retainer disposed on the litter box cover section adjacent the tray insertion aperture.

DETAILED DESCRIPTION

Figure 1:
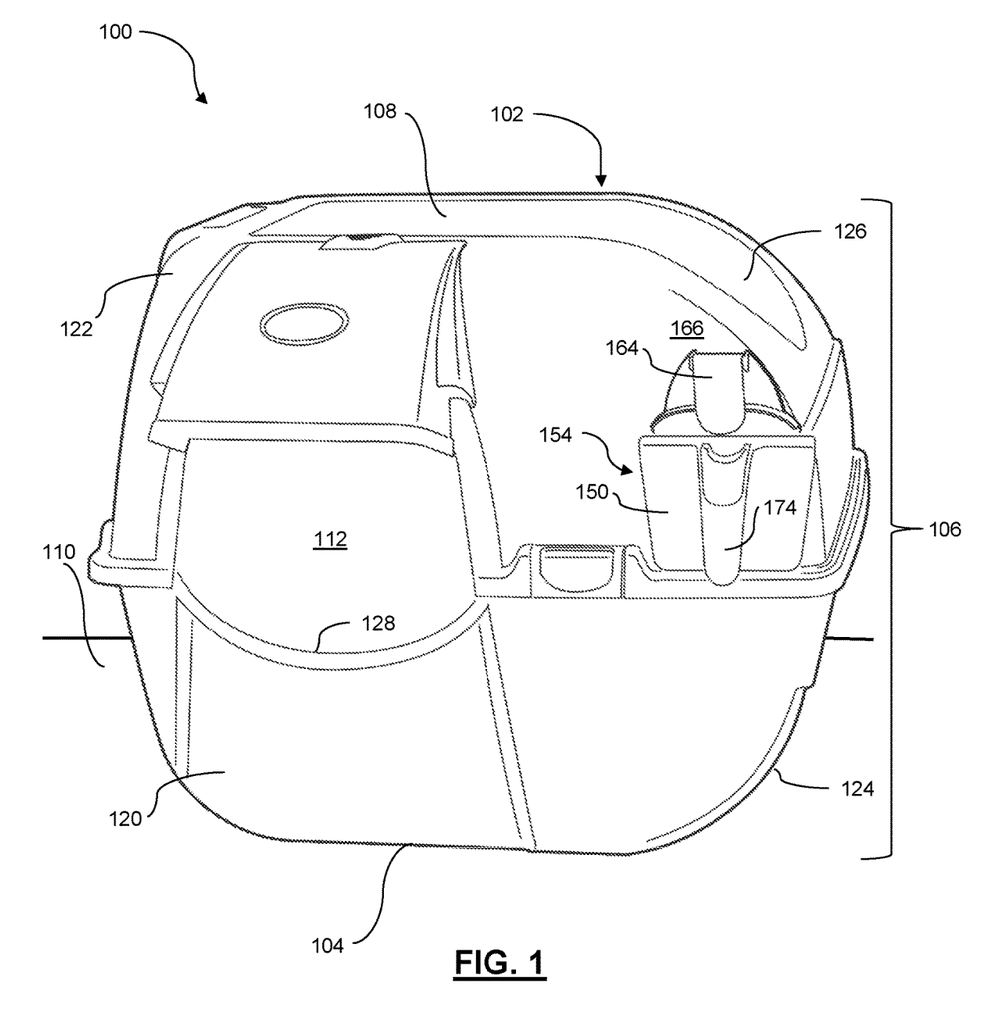
FIG. 1 is a top front perspective view of an illustrative litter box according to an aspect of the present disclosure.

Reference is now made to FIG. 1, which shows an illustrative litter box, indicated generally by reference 100, according to an aspect of the present disclosure. The litter box 100 comprises an enclosure 102 having a base 104, a convexly curved sidewall 106, and a roof 108. The base 104 of the enclosure 102 is adapted to rest on a substantially flat surface 110. Preferably the base 104 is generally planar (flat) although it is also contemplated that the base may have short legs or feet extending therefrom. The litter box 100 can be rolled along the convexly curved sidewall 106 onto its roof 108, and then back along the convexly curved sidewall 106 onto its base 104, as will be described further below. The enclosure 102 has a feline transit doorway 112 opening into an interior volume 114 (see FIGS. 2A to 3E) of the enclosure 102; the feline transit doorway 112 is adapted to accommodate *Felis catus* ingress into and egress from the interior volume 114.

Reference is now made to FIGS. 2A to 2E, which are cut-away views of the litter box 100. As can best be seen in FIG. 2A, the base 104 of the enclosure 102 forms a litter pan 116 adapted for receiving granular kitty litter 118 and cat excrement 119. Preferably, the kitty litter 118 is clumping kitty litter that will create clumps from liquid waste. The cat excrement 119 comprises solid waste and/or urine-saturated clumps of the kitty litter 118. In the illustrated embodiment, the enclosure 102 is formed by a litter box pan section 120 and a litter box cover section 122 that is releasably securable to the litter box pan section 120, for example by clips or other suitable fasteners, such that the litter box cover section 122 is adapted to cover the litter box pan section 120. The litter box pan section 120 forms a basin that defines the litter pan 116. The convexly curved sidewall 106 of the enclosure 102 is formed by a convexly curved side 124 of the litter box pan section 120 cooperating with a convexly curved side 126 of the litter box cover section 122. The feline transit doorway 112 is formed by respective arches 128, 130 formed in the litter box pan section 120 and the litter box cover section 122, with the respective arches 128, 130 being in registration with one another.

While the preferred embodiment comprises a litter box pan section 120 and a litter box cover section 122 that can be releasably secured together, other modes of constructing the enclosure are also within the scope of the present disclosure. For example a litter box pan section and a litter box cover section may be permanently joined, or the enclosure may comprise a unitary structure incorporating the base, roof, convexly curved sidewall and opposite sidewall with a removable front and/or back panel. Other embodiments are also contemplated.

Figure 2A:
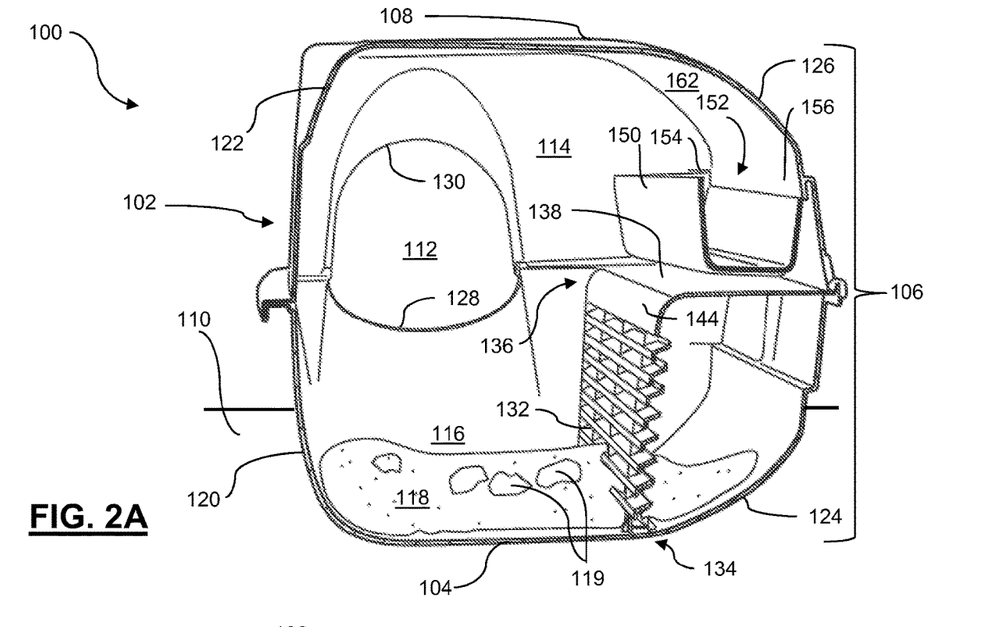
FIGS. 2A to 2E show a mirror image cut-away view of the litter box of FIG. 1 in various stages of rolling for self-cleaning of the litter box.

Continuing to refer to FIG. 2A, a grate 132 extends inwardly from adjacent the base 104 into the interior volume 114. As used in this context, the term "adjacent" includes an arrangement in which the grate 132 directly engages the base 104 (directly adjacent), and also includes an arrangement in which the grate 132 is spaced from the base 104 but remains adjacent thereto. In the illustrated embodiment, the grate 132 is substantially upright when the litter box 100 is resting on the base 104. The grate 132 preferably has a grid or lattice structure, although other structures are also contemplated. For example, the grate may have a grill structure comprising only closely spaced parallel members, rather than a grid or lattice structure. The grate 132 has a first end 134 adjacent the base 104. In a preferred embodiment, the first end 134 of the grate 132 directly engages the base 104 and is physically coupled thereto, although in other embodiments the first end 134 of the grate 132 may be spaced from the base 104. A second end 136 of the grate 132, opposite the first end 134 thereof, supports a shelf 138, which extends inwardly from adjacent the convexly curved sidewall 106 into the interior volume 114. As used in this context, the term "adjacent" includes an arrangement in which the shelf 138 directly engages the convexly curved sidewall 106 (directly adjacent) and also includes an arrangement in which the shelf 138 is spaced from the convexly curved sidewall 106 but remains adjacent thereto.

The grate 132 and the shelf 138 converge in the interior volume 114. The terms "converge" and "converging", as used in this context, include arrangements in which the grate and the shelf directly engage one another, or are slightly spaced from one another, as well as arrangements in which one of the grate and the shelf projects beyond the other. The terms "converge" and "converging" further include arrangements in which the grate and the shelf are conjoined, as shown in the illustrated embodiment.

In the illustrated embodiment, the grate 132 and the shelf 138 are formed from a single piece of monolithic construction, with the first end of the grate 132 fixed to the litter box pan section 120 on an interior surface of the base 104, a bend 144 joining the second end 136 of the grate 132 to an inner end of the shelf 138, and an outer end of the shelf 138 supported on the convexly curved side 124 of the litter box pan section 120. Thus, in the illustrated embodiment both the grate 132 and the shelf 138 are disposed on the litter box pan section 120. In other embodiments, the shelf may be disposed on the litter box cover section 122. Moreover, while in the illustrated embodiment the grate 132 and the shelf 138 are formed from a single piece 140 of monolithic construction, in other equivalent embodiments, the grate and the shelf may be formed of two or more pieces, and one or both of the grate and the shelf, or parts thereof, may be formed as part of the litter box pan section 120 and/or the litter box cover section 122. For example, the shelf may be formed as part of, or fixed to, the litter box cover section and the grate may be formed as part of, or fixed to, the litter box pan section.

The shelf 138 is adapted to support a waste removal tray 150 having its tray opening 152 facing the roof 108 of the enclosure 102. The enclosure 102 has a tray insertion aperture 154 formed therein, proximal to the shelf 138. The tray insertion aperture 154 allows the waste removal tray 150 to be selectively inserted into and withdrawn from the enclosure 102. In the illustrated embodiment, the tray insertion aperture 154 is disposed on the litter box cover section 122 although other embodiments are also contemplated. The enclosure 102 includes a retaining element 156 to maintain the waste removal tray 150 in position on the shelf 138 during rolling of the enclosure 102. In the illustrated embodiment, the retaining element 156 takes the form of an inward projection 156 from the convexly curved side 126 of the litter box cover section 122. The projection 156 forms a channel adapted to receive an upper edge of the waste removal tray 150. An arcuate projection may extend from the shelf 138 to urge the waste removal tray 150 upward during insertion so as to trap the upper edge of the waste removal tray 150 in the channel formed by the projection 156 when fully inserted, and thereby retain the waste removal tray 150 in the enclosure 102 until intentionally withdrawn. The channel-forming inward projection 156 is merely one illustrative example of a retaining element, and other types of retaining element may equivalently be used to maintain the waste removal tray in position on the shelf during rolling.

Figure 2B:
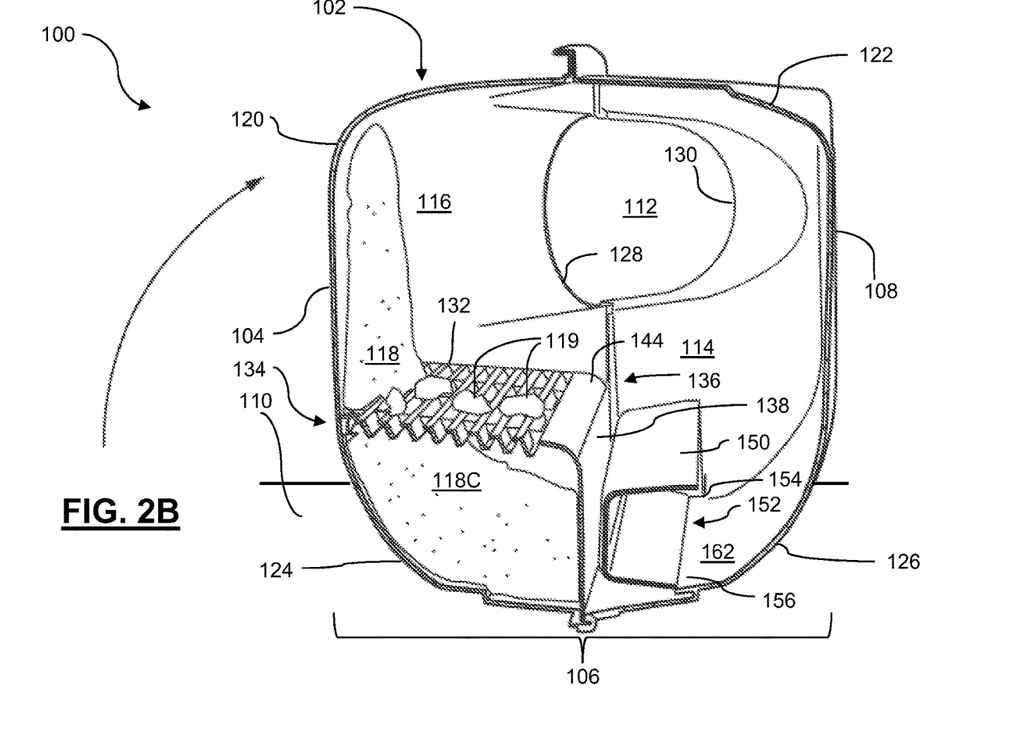
Figure 2C:
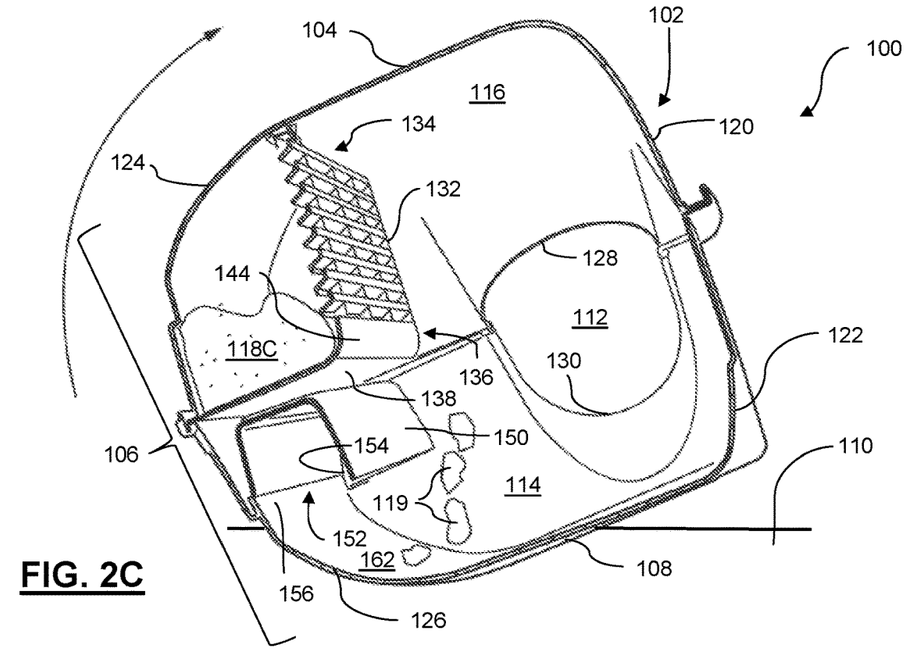
Figure 2D:
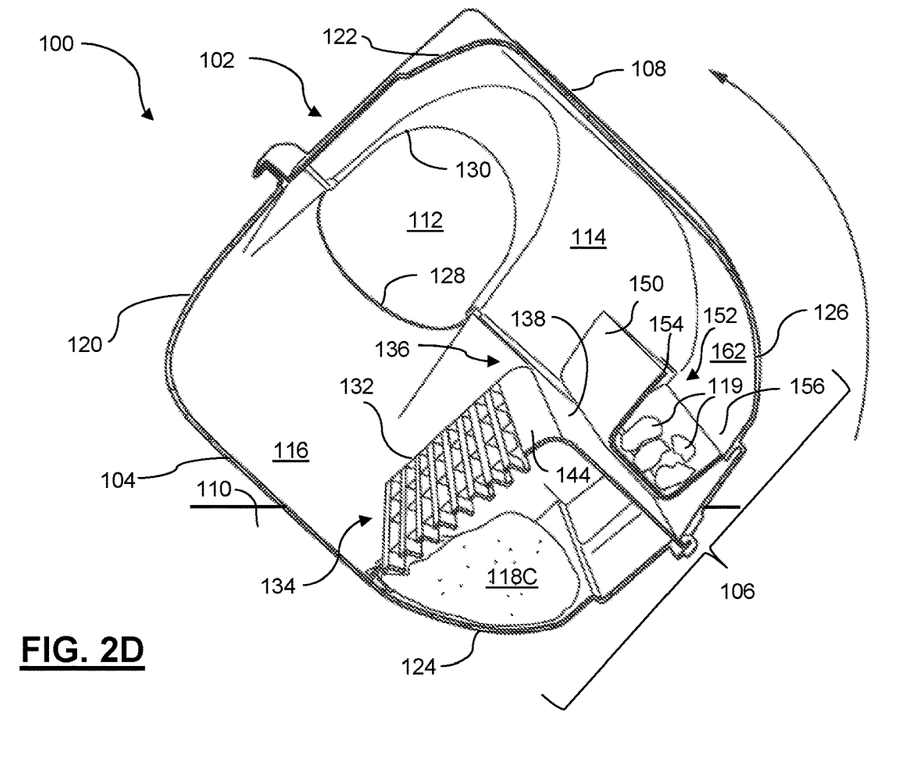
Figure 2E:
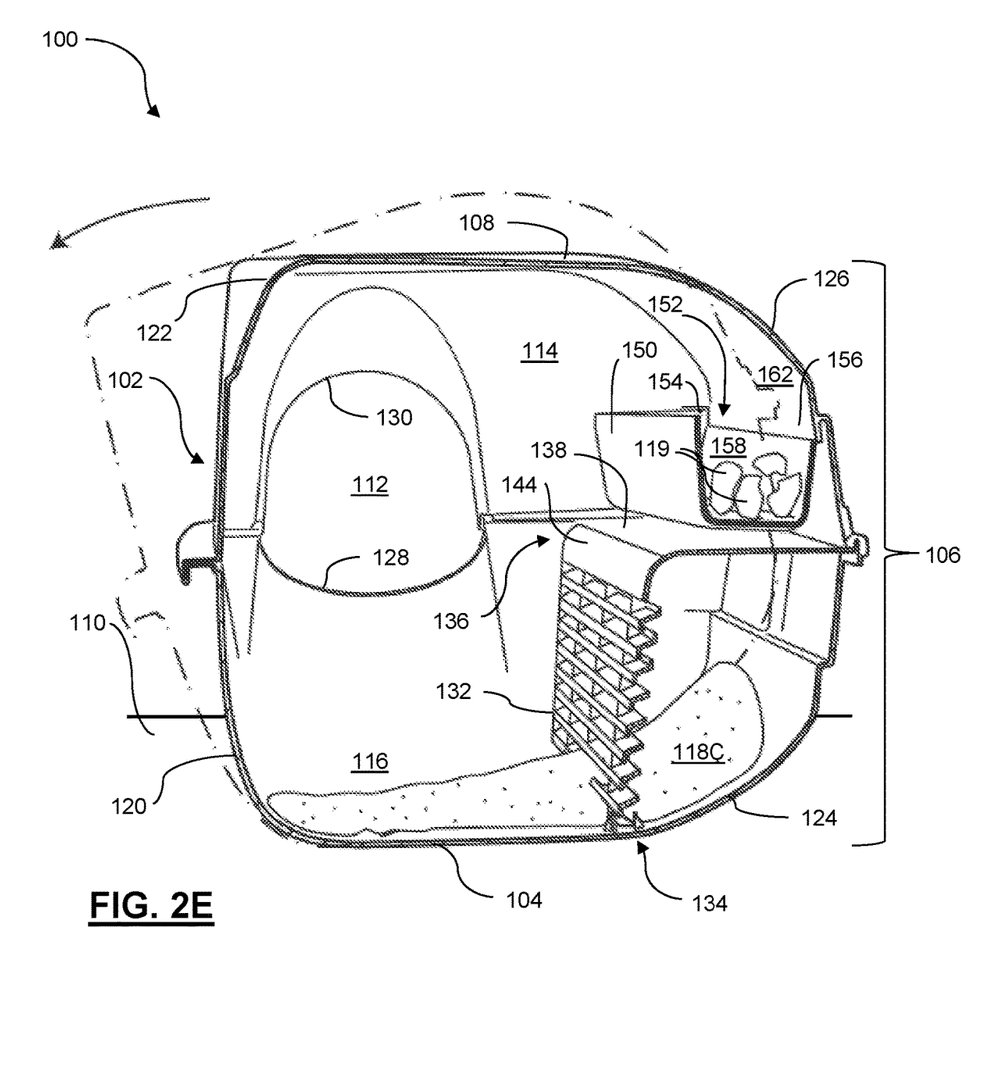

Referring now to FIG. 2B, upon rolling of the enclosure 102 onto the convexly curved sidewall 106, more particularly onto the convexly curved side 124 of the litter box pan section 120, the kitty litter 118 begins to pass through the grate 132 while the cat excrement 119 is trapped on the surface of the grate 132, being too large to pass therethrough. Referring now to FIG. 2C, on further rolling of the enclosure 102 along the convexly curved side 126 of the litter box cover section 122, such that the enclosure 102 is substantially inverted, the cat excrement falls 120 from the grate onto an inner surface 162 of the roof 108 and the kitty litter 118 passes through the grate 132 so as to become cleaned kitty litter 118C. Referring now to FIGS. 2D and 2E, rolling the enclosure 102 back in the other direction along the convexly curved side 126 of the litter box cover section 122 (FIG. 2D) and then along the convexly curved side 124 of the litter box pan section 120 back onto the base 104 (FIG. 2E) causes the cat excrement 119 to fall into the waste removal tray 150 via the tray opening 152 thereof and causes the cleaned kitty litter 118C to fall back through the grate 132 into the litter pan 116. The retaining element 156 maintains the waste removal tray 150 in position on the shelf 138 during rolling of the enclosure 102, and once the enclosure 102 once again rests on the base 104, the waste removal tray 150 can be withdrawn to dispose of the cat excrement 119.

As can be seen in the Figures, the convexly curved sidewall 106 includes flat or planar portions, and the term "convexly curved", as used herein, does not require continuous curvature. Rather, the term "convexly curved" includes any suitable shape that sufficiently approximates a convex curve so as to enable rolling. For example, and without limitation, a polyhedral shape, or a combination of polyhedral and curved shapes, may be used.

Referring again to FIG. 1, a bag retainer 164 is disposed on the litter box cover section 122 enclosure adjacent the tray insertion aperture 154. In the illustrated embodiment, the bag retainer 164 is disposed on the outer surface 166 of the litter box cover section 122 and therefore on the outer surface of the enclosure 102; although less preferred it is also contemplated that in other embodiments the bag retainer 164 may be disposed on an inner surface of the enclosure (e.g. the inner surface of the litter box cover section). The bag retainer 164 is adapted to releasably retain the edge 168 of a flexible bag 170 (see FIGS. 3A to 3E). Although a plastic bag is preferred, a bag of any suitable material may be used. In the illustrated embodiment the bag retainer 164 comprises a clip 164 that is pivotally coupled (hinged) to the litter box cover section 122 and can be closed by a snap fit onto a retaining latch 172 (see FIGS. 3A to 3E). The plastic bag 170 is not shown in FIGS. 1 and 2A to 2E for clarity of illustration. Also, while it is preferred to use a plastic bag 170 that generally corresponds in size to the waste removal tray 150 (excluding the handle 174 thereof) such that the edge 168 is an opening edge 168 of the plastic bag 170, this is not required and a larger bag may be used, with the bag retainer 164 retaining an intermediate edge of the bag.

The clip 164 is merely one illustrative embodiment of a bag retainer, and other types of bag retainers, such as clothespin-type arrangements, hooks, resilient bands, magnetic arrangements or reusable releasable adhesive arrangements, among others, can also be used. In some embodiments, more than one bag retainer may be provided.

Reference is now made to FIGS. 3A to 3E.

Figure 3A:
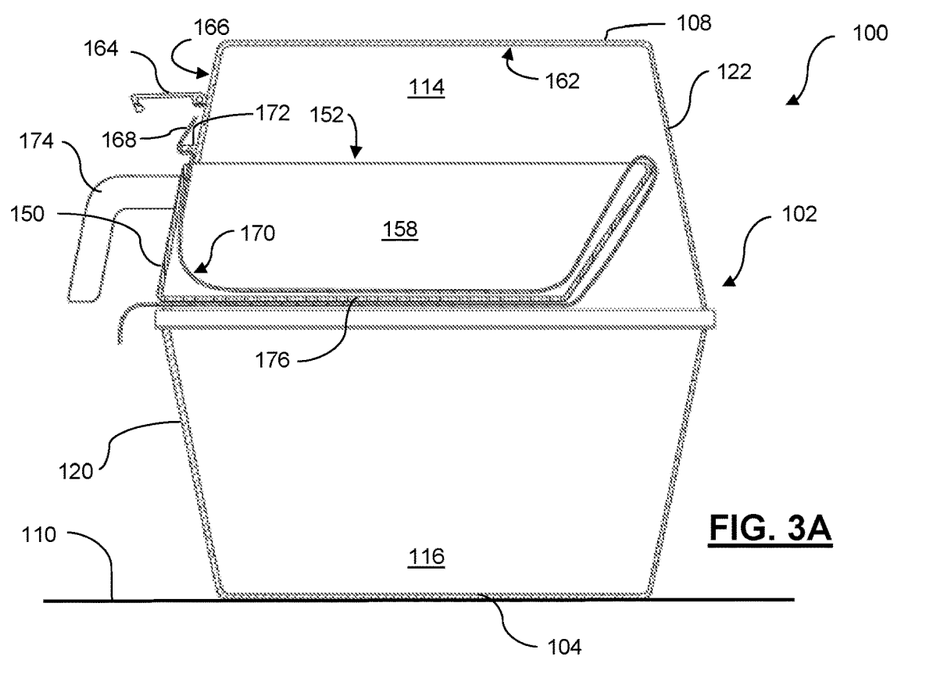
FIGS. 3A to 3E are cross-sectional views showing removal of a waste disposal tray of the litter box of FIG. 1 illustrating self-bagging of cat excrement.

Before inserting the waste removal tray 150 into the tray insertion aperture 154, a user loosely envelopes the waste removal tray 150 within a flexible plastic bag 170 so that the plastic bag 170 generally surrounds the waste removal tray 150, other than a handle 174 thereof. The user then inserts the enveloped waste removal tray 150 together with the enveloping plastic bag 170 into the tray insertion aperture 154. Thus, as shown in FIG. 3A, within the enclosure 102, the waste removal tray 150 is enveloped by the flexible plastic bag 170 and is disposed on the shelf 138 (see FIGS. 2A to 2E) with its tray opening 152 facing the inner surface 162 of the roof 108, retained by the retaining element 156 (see FIGS. 2A to 2E). A portion of the flexible plastic bag 170 is collapsed through the tray opening 152 and into the interior 158 of the waste removal tray 150 to rest on the bottom 176 thereof. The user then closes the clip 164 to trap the opening edge 168 of the plastic bag 170 between the clip 164 and the retaining latch 172, so that the clip 164 releasably retains the opening edge 168 of the plastic bag 170.

During rolling of the enclosure 102 as shown in FIGS. 2A to 2E described above, while the waste removal tray 150 is disposed on the shelf 138 with its tray opening 152 facing the inner surface 162 of the roof 108, the waste removal tray 152 is enveloped by the plastic bag 170, a portion of which is collapsed into the tray interior 158. Accordingly, when the cat excrement 119 falls into the waste removal tray 150 via the tray opening 152 when the enclosure 102 is rolled back onto its base 104, as shown in FIG. 2E, the cat excrement will fall into the tray opening 152 and onto the generally concave portion of the plastic bag 170 collapsed into the interior 158 of the waste removal tray 150. Thus, the term "loosely enveloped" means that the plastic bag 170 is fitted around the waste removal tray 150 with sufficient slack to allow the plastic bag 170 to collapse into the interior 158 of waste removal tray 150 along with the cat excrement 119, rather than being stretched taught across the tray opening 152 such that the cat excrement 119 would bounce off of the plastic bag 170.

Figure 3B:
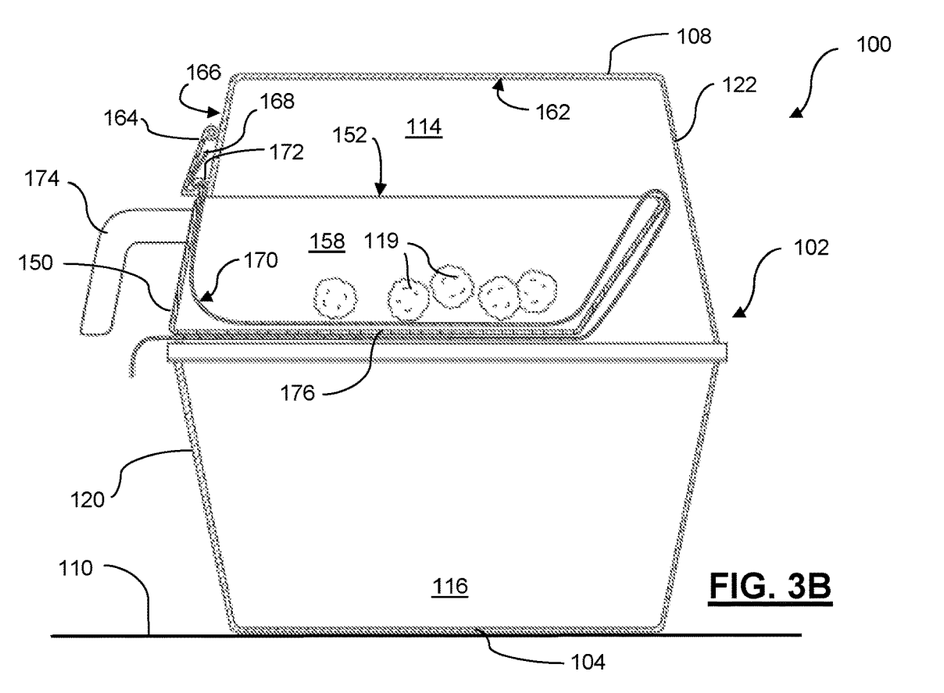
Figure 3C:
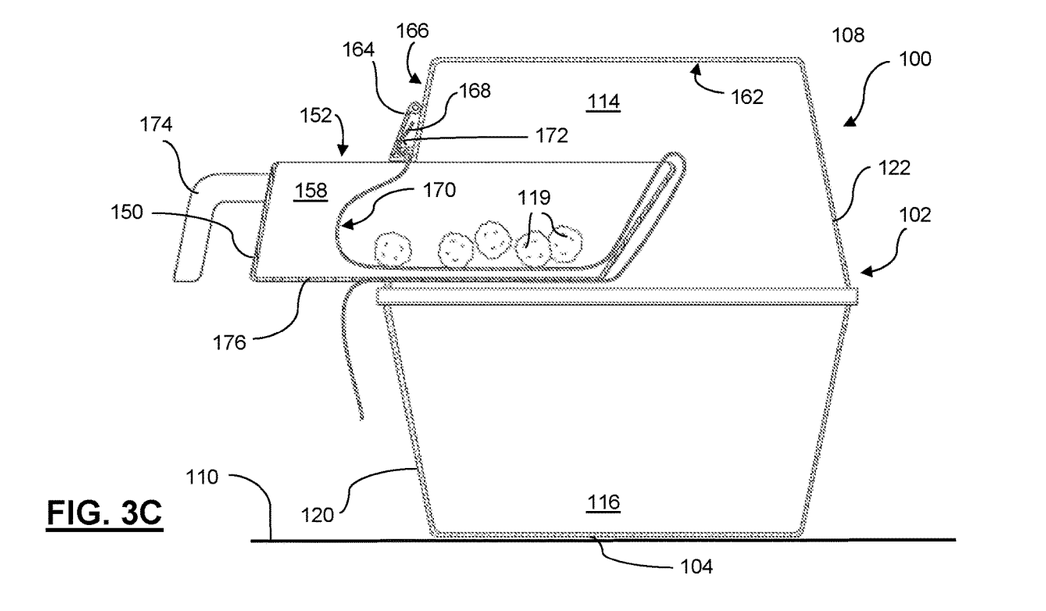
Figure 3D:
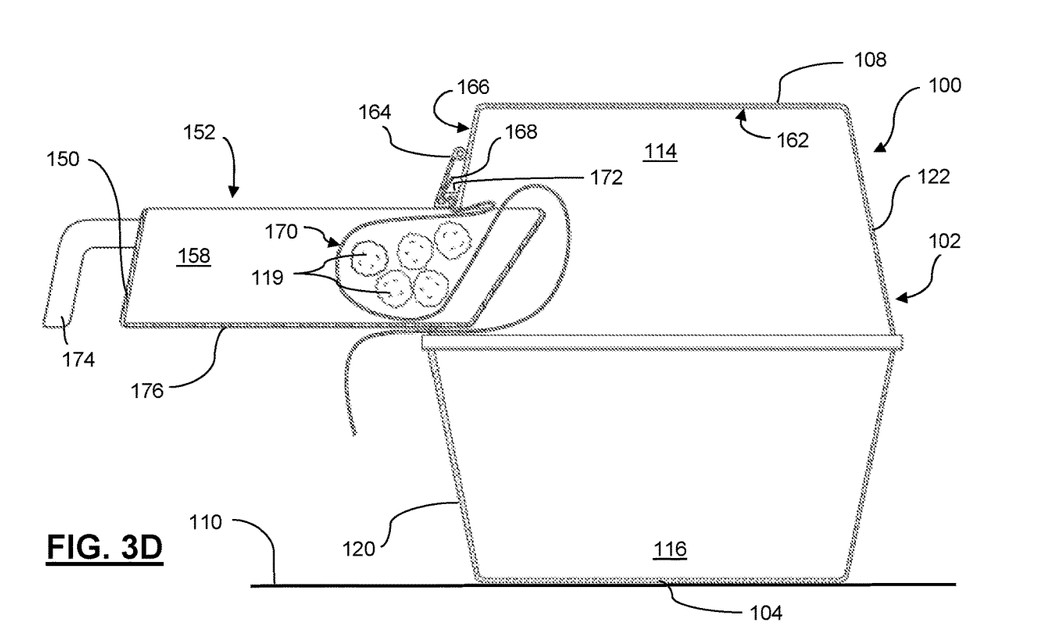
Figure 3E:
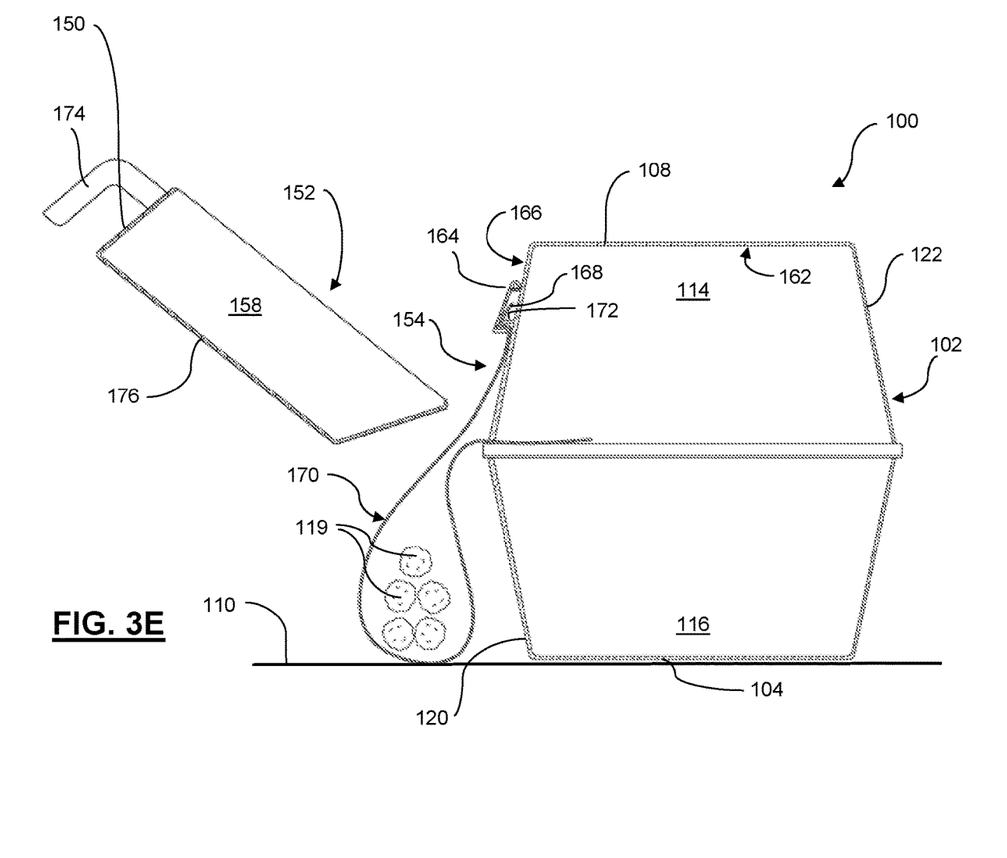
Figure 4:
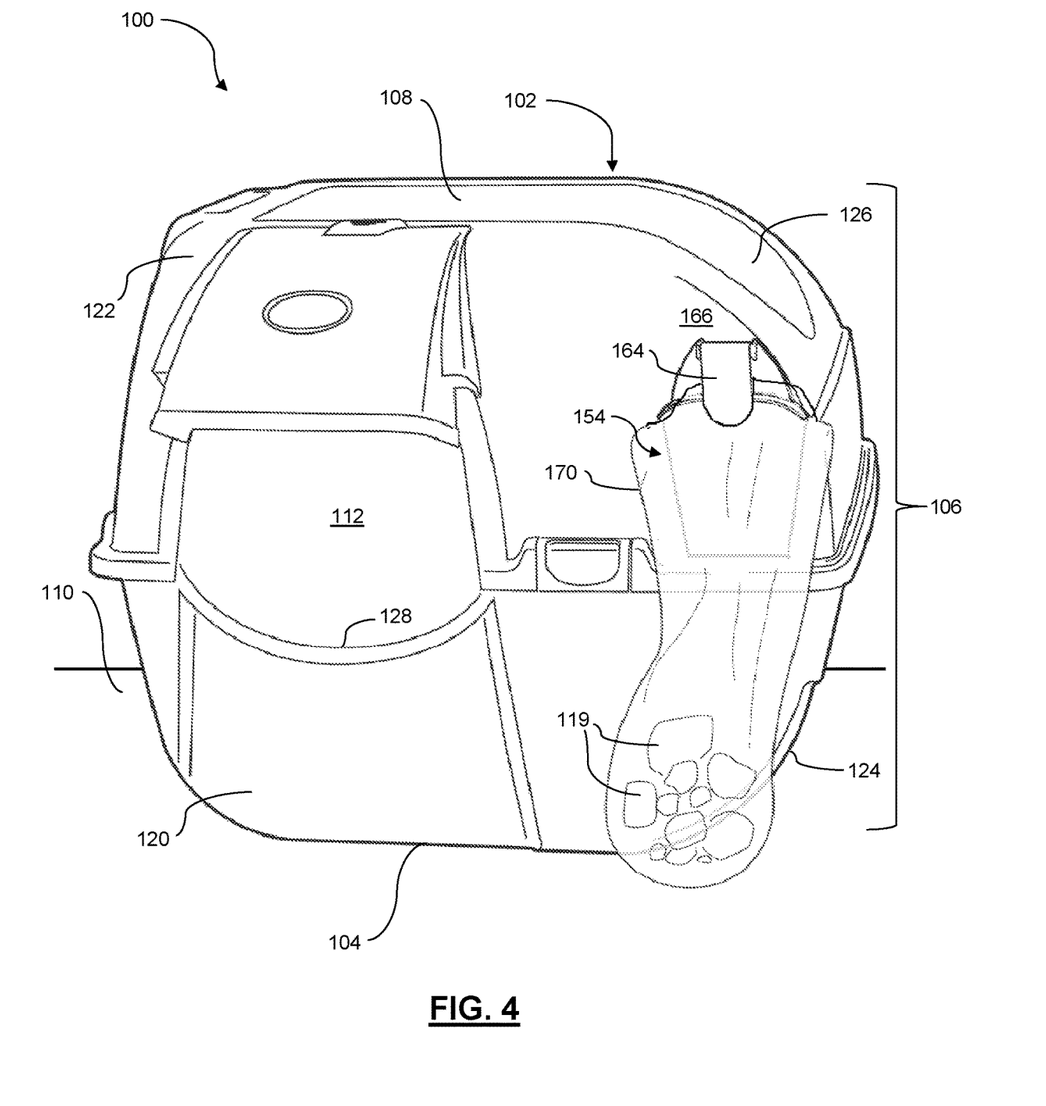
FIG. 4 is a top front perspective view of the litter box of FIG. 1 showing an inverted plastic bag containing cat excrement suspended from the litter box after removal of a waste removal tray therefrom.

After the rolling steps shown in FIGS. 2A to 2E with the plastic bag 170 enveloping the waste removal tray 150, the cat excrement 119 will rest inside the waste removal tray 150, atop the collapsed plastic bag 170, as shown in FIG. 3B. During withdrawal of the waste removal tray 150 from the tray insertion aperture 154, the opening edge 168 of the plastic bag 170 is retained by the clip 164 and the retaining latch 172 so that the opening edge 168 of the plastic bag 170 is substantially fixed relative to the waste removal tray 150. As the waste removal tray 150 is withdrawn from the enclosure 102, retention of the opening edge 168 of the plastic bag 170 cooperates with the movement of the waste removal tray 150 to invert the plastic bag 170 and retain the cat excrement 119 within the inverted plastic bag 170, as shown in FIGS. 3C and 3D. More particularly, after rolling of the enclosure 102, the portion of the plastic bag 170 that had collapsed into the interior 158 of the waste removal tray will be held between the cat excrement 119 and the bottom 176 of the waste removal tray 150. As the waste removal tray 150 is withdrawn, the plastic bag 170 will be pulled along and turned inside out, capturing the cat excrement 119 inside the inverted plastic bag 170, as shown in FIG. 3D. After the waste removal tray 150 has been completely withdrawn, the inverted plastic bag 170 will be suspended by the clip 164 and the retaining latch 172 with the cat excrement inside, as shown in FIG. 3E and in FIG. 4. The clip 164 can then be opened and the plastic bag 170 can be conveniently disposed of.

A litter box according to the present disclosure may be used either with or without a bag.

Certain illustrative embodiments have been described by way of example. It will be apparent to persons skilled in the art that a number of variations and modifications can be made without departing from the scope of the claims.

The following list of reference numerals is provided for ease of reference, and without limitation:

100 Litter box
102 Enclosure
104 Base of enclosure
106 Convexly curved sidewall of enclosure
108 Roof of enclosure
110 Substantially flat surface
112 Feline transit doorway
114 Interior volume
116 Litter pan
118 Kitty litter
119 Cat excrement
120 Litter box pan section
122 Litter box cover section
124 Convexly curved side of litter box pan section
126 Convexly curved side of litter box cover section
128 Arch formed in litter box pan section
130 Arch formed in litter box cover section 132 Grate
134 First end of grate
136 Second end of grate
138 Shelf
144 Bend in monolithic piece
150 Waste removal tray
152 Tray opening
154 Tray insertion aperture
156 Retaining element
158 Interior of waste removal tray
162 Inner surface of roof
164 Bag retainer
166 Outer surface of litter box cover section
168 Opening edge of plastic bag
170 Plastic bag
172 Retaining latch
174 Handle of waste removal tray
176 Bottom of waste removal tray

What is claimed is:

1. A litter box, comprising:
an enclosure having a base adapted to rest on a substantially flat surface, a roof and a convexly curved sidewall whereby the litter box can be rolled along the convexly curved sidewall, onto its roof, and then back along the convexly curved sidewall onto its base;
the base of the enclosure forming a litter pan adapted for receiving granular kitty litter and cat excrement comprising at least one of solid waste and urine-saturated clumps;
the enclosure having a feline transit doorway opening into an interior volume thereof, the feline transit doorway adapted to accommodate *Felis catus* ingress into and egress from the interior volume;
a grate extending from adjacent the base into the interior volume;
a shelf extending from adjacent the convexly curved sidewall into the interior volume;
the grate and the shelf converging in the interior volume;
the shelf adapted to support a waste removal tray having its tray opening facing the roof of the enclosure;
the enclosure having a tray insertion aperture proximal to the shelf whereby the waste removal tray can be selectively inserted into and withdrawn from the enclosure;
wherein, upon rolling of the enclosure onto the convexly curved sidewall, the kitty litter begins to pass through the grate while the cat excrement is trapped on the surface of the grate, being too large to pass therethrough;
and wherein on further rolling, the enclosure is substantially inverted, whereby the cat excrement falls from the grate onto an inner surface of the roof and the kitty litter passes through the grate so as to become cleaned kitty litter;
and wherein rolling the enclosure back in the other direction causes the cat excrement to fall into the waste removal tray via the tray opening thereof and causes the cleaned kitty litter to fall back through the grate into the litter pan;
the enclosure having at least one retaining element to maintain the waste removal tray in position on the shelf during rolling of the enclosure;
and wherein the waste removal tray can be withdrawn to dispose of the cat excrement;
characterized in that:
at least one bag retainer is disposed on the enclosure adjacent the tray insertion aperture;
the waste removal tray is loosely enveloped by a flexible bag while the waste removal tray is disposed on the shelf with its tray opening facing an inner surface of the roof of the enclosure;
the at least one bag retainer releasably retains the bag; and
upon withdrawal of the waste removal tray from the enclosure, retention of the bag cooperates with movement of the waste removal tray to invert the plastic bag and retain the cat excrement within the inverted bag.

2. The litter box of claim 1, wherein:
the enclosure is formed by a litter box pan section and a litter box cover section releasably securable to the litter box pan section; and
wherein the litter box cover section is adapted to cover the litter box pan section to form the litter box.

3. The litter box of claim 2, wherein:
the convexly curved sidewall of the enclosure is formed by a convexly curved side of the litter box pan section cooperating with a convexly curved side of the litter box cover section; and
the feline transit doorway is formed by respective arches formed in the litter box pan section and the litter box cover section;
the respective arches being in registration with one another.

4. The litter box of claim 2, wherein:
the grate and the shelf are disposed on the litter box pan section;
the tray insertion aperture is disposed on the litter box cover section; and
the at least one bag retainer is disposed on the litter box cover section.

5. The litter box of claim 2, wherein the at least one bag retainer is disposed on an outer surface of the enclosure.

6. The litter box of claim 2, wherein the bag retainer comprises a clip.

7. A method of removing cat excrement from a litter box, wherein:
the litter box comprises an enclosure having a base adapted to rest on a substantially flat surface, a roof and a convexly curved sidewall whereby the litter box can be rolled along the convexly curved sidewall, onto its roof, and then back along the convexly curved sidewall onto its base;
the base of the enclosure forms a litter pan containing granular kitty litter and cat excrement comprising at least one of solid waste and urine-saturated clumps;
the enclosure having a feline transit doorway opening into an interior volume thereof, the feline transit doorway adapted to accommodate *Felis catus* ingress into and egress from the interior volume;
a grate extending from adjacent the base into the interior volume;
a shelf extending from adjacent the convexly curved sidewall into the interior volume;
the grate and the shelf converging in the interior volume;
the shelf adapted to support a waste removal tray having its tray opening facing the roof of the enclosure;
the enclosure having a tray insertion aperture proximal to the shelf whereby the waste removal tray can be selectively inserted into and withdrawn from the enclosure;
the enclosure having at least one retaining element to maintain the waste removal tray in position on the shelf during rolling of the enclosure;

the method comprising:
rolling of the enclosure onto the convexly curved sidewall, whereby the kitty litter begins to pass through the grate while the cat excrement is trapped on the surface of the grate, being too large to pass therethrough;
further rolling the enclosure until the enclosure is substantially inverted, whereby the cat excrement falls from the grate onto an inner surface of the roof and the kitty litter passes through the grate so as to become cleaned kitty litter;
rolling the enclosure back in the other direction, thereby causing the cat excrement to fall into the waste removal tray via the tray opening thereof and causing the cleaned kitty litter to fall back through the grate into the litter pan; and
withdrawing the waste removal tray to dispose of the cat excrement;
characterized in that:
during rolling of the enclosure, while the waste removal tray is disposed on the shelf with its tray opening facing an inner surface of the roof of the enclosure, the waste removal tray is loosely enveloped by a flexible bag;
during withdrawal of the waste removal tray, an edge of the bag is retained substantially fixed relative to the waste removal tray whereby withdrawal of the waste removal tray inverts the plastic bag whereby the cat excrement is retained within the inverted plastic bag.

8. The method of claim 7, wherein the bag is retained by at least one bag retainer disposed on the enclosure adjacent the tray insertion aperture.

9. The method of claim 8, wherein the at least one bag retainer is disposed on an outer surface of the enclosure.

10. The method of claim 8, wherein the at least one bag retainer comprises a clip.

11. The method of claim 7, further characterized in that the method comprises:
before inserting the waste removal tray into the enclosure through the tray insertion aperture, enveloping the waste removal tray within the bag; and
inserting the enveloped waste removal tray together with the enveloping bag through the tray insertion aperture into the enclosure.

12. The method of claim 7, wherein:
the enclosure is formed by a litter box pan section and a litter box cover section releasably securable to the litter box pan section; and
the litter box cover section is adapted to cover the litter pan to form the litter box.

13. The method of claim 12, wherein:
the convexly curved sidewall of the enclosure is formed by a convexly curved side of the litter box pan section cooperating with a convexly curved side of the litter box cover section; and
the feline transit doorway is formed by respective arches formed in the litter box pan section and the litter box cover section;
the respective arches being in registration with one another.

14. The method of claim 13, wherein:
the grate and the shelf are disposed on the litter box pan section; and
the tray insertion aperture is disposed on the litter box cover section.

15. The method of claim 14, wherein the bag is retained by at least one bag retainer disposed on the litter box cover section adjacent the tray insertion aperture.

\* \* \* \* \*